Oct. 11, 1949.  B. N. SIKKA ET AL  2,484,656
APPARATUS FOR MOLDING PLASTIC SHEET MATERIAL
Filed June 18, 1946  4 Sheets-Sheet 1
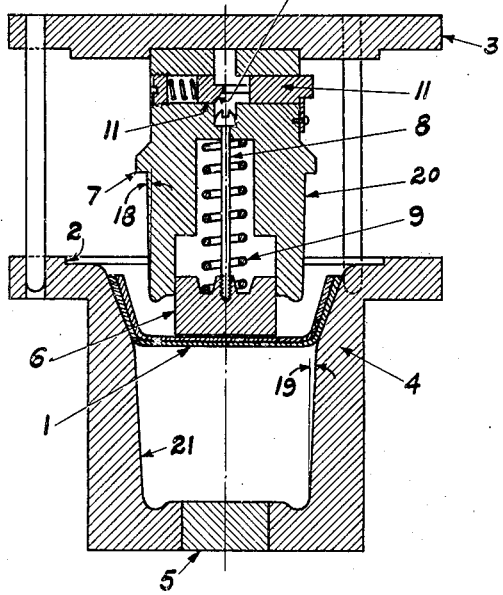
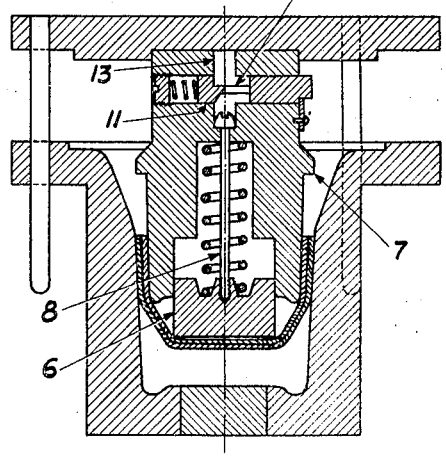
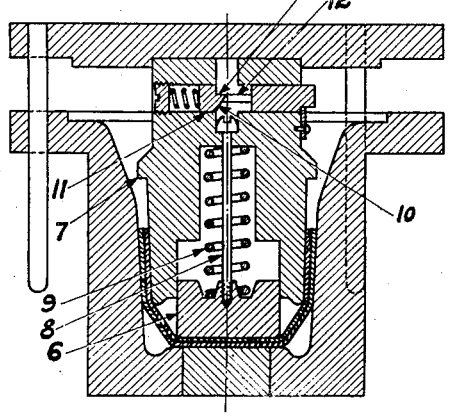
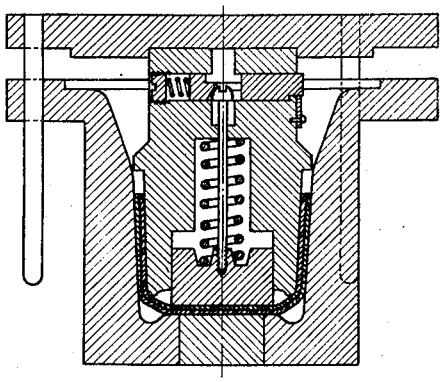
INVENTORS
BASHESHAR NATH SIKKA
GURBUX SINGH
LAL CHAND VERMAN
BY Otto Munk
THEIR ATTY Oct. 11, 1949.  B. N. SIKKA ET AL  2,484,656
APPARATUS FOR MOLDING PLASTIC SHEET MATERIAL
Filed June 18, 1946  4 Sheets-Sheet 2
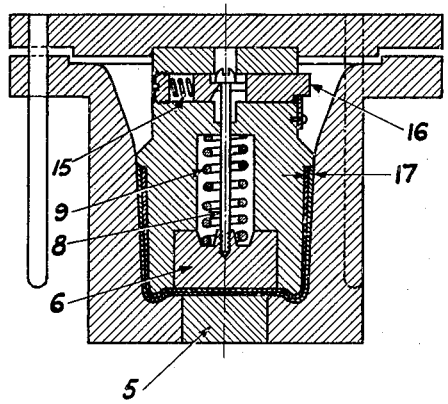
FIG. V
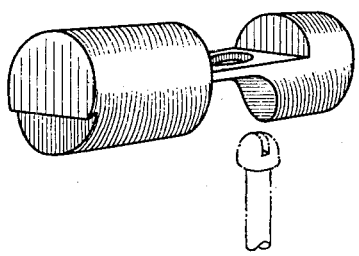
FIG. VA
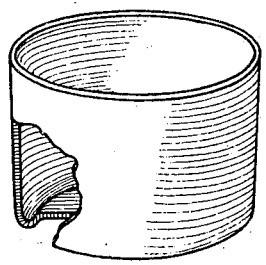
FIG. VB
INVENTORS
BASHESHAR NATH SIKKA
GURBUX SINGH
LAL CHAND VERMAN
BY Otto Munk
THEIR ATTY

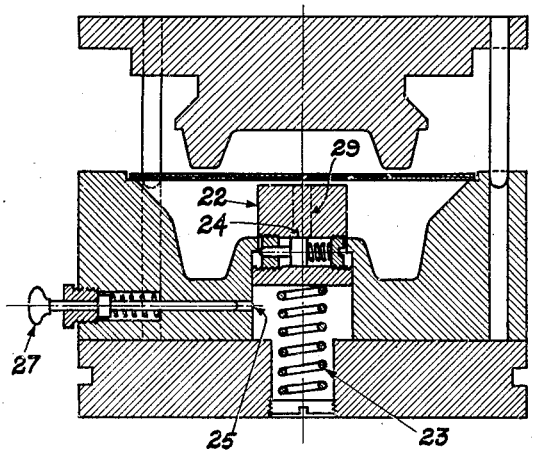
FIG. VI
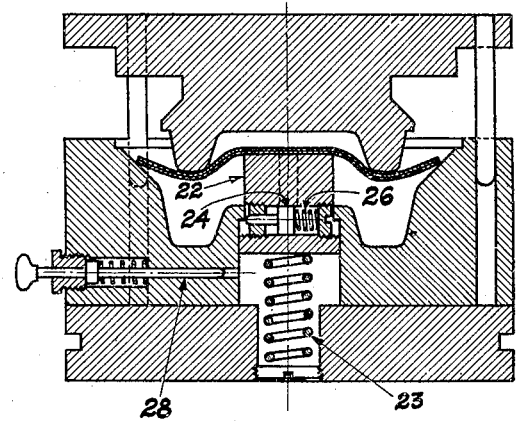
FIG. VII
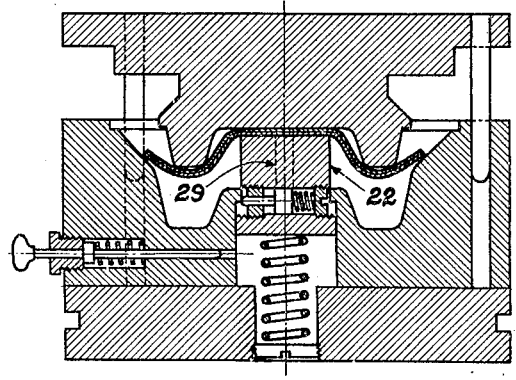
FIG. VIII
INVENTORS
BASHESHAR NATH SIKKA
GURBUX SINGH
LAL CHAND VERMAN
BY Otto Munk
THEIR ATTY Oct. 11, 1949.   B. N. SIKKA ET AL   2,484,656
APPARATUS FOR MOLDING PLASTIC SHEET MATERIAL
Filed June 18, 1946   4 Sheets-Sheet 4
FIG. IX
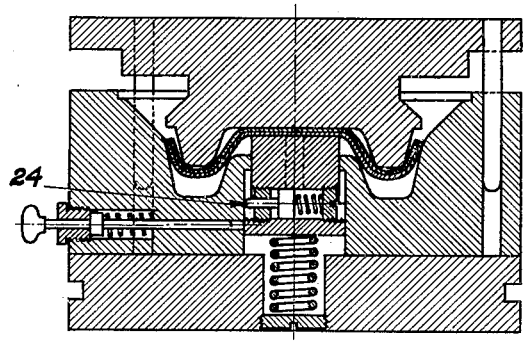
FIG. X
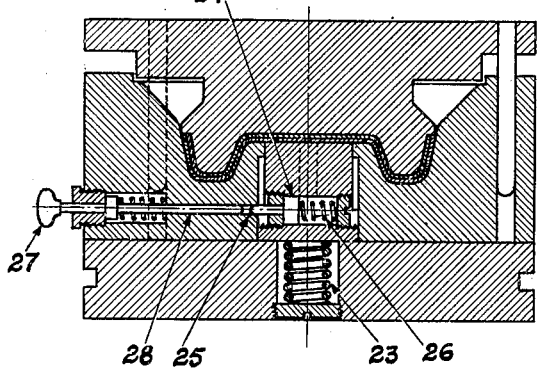
FIG. XI
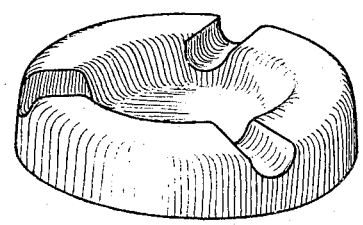
INVENTORS
BASHESHAR NATH SIKKA
GURBUX SINGH
LAL CHAND VERMAN
BY Otto Munk
THEIR ATTY Patented Oct. 11, 1949

2,484,656

UNITED STATES PATENT OFFICE 2,484,656

APPARATUS FOR MOLDING PLASTIC SHEET MATERIAL

Basheshar N. Sikka, Gurbux Singh, and Lal C. Verman, Delhi, British India

Application June 18, 1946, Serial No. 677,608
In British India July 9, 1945

3 Claims. (Cl. 18—35)

This invention relates to improvement in the manufacture of containers, hollow-ware or the like articles from resin impregnated laminations.

It is known in machines for moulding sheet material to employ a disengaging plunger slidably mounted in the upper die, said plunger having a spring controlled head which head disengages the moulded receptacle from the die as the die starts to rise.

It is also known in capsule making machines to provide a spring controlled ejector head in the mould chamber, said head having a groove which is engaged by a cam operated locking pin.

The main object of the present invention is to devise a method by which deep mouldings such as cigarette containers may be manufactured out of resin impregnated laminations.

Another object of the present invention is to improve the technique of container manufacture by reducing the number of operations to the barest minimum for the production of a given shape of container.

The invention will be described with reference to the accompanying drawings in which Figures I-V show in sectional elevation the various stages in the manufacture of containers or the like articles according to our present invention, and also more particularly, the manufacture of a cigarette container. Fig. VA shows the locking pin in perspective. Fig. VB is a perspective view of the cigarette container.

Impregnated laminations or blanks which are used as the starting material in the present invention may be made out of the diverse forms of cotton cloth, jute cloth, paper, or any similar fibrous sheet material. For example, jute may be used in the form of hessian, or canvas. The fibrous material is impregnated with an impregnating agent such as phenolic resins.

Laminations impregnated with rubber alone cannot be expected to stand the drastic draw involved in the method according to our invention, and as such our invention cannot be applicable to rubber impregnated fabrics except in cases where rubber might be used only as a plasticiser and modifying agent in small quantities to the main bulk of resinous material with which laminations are impregnated.

Impregnation may be carried out by soaking or by vacuum pressure technique well known to those experienced in the art.

The invention is described with reference to the accompanying drawings in which Fig. I shows in sectional elevation the co-acting mould parts the male portion of which comprises the spring loaded plunger. The mould elements are deviced for making a cigarette container.

Fig. II is a similar view showing another stage in the pressing operation.

Fig. III is a similar view showing a further stage in the pressing operation.

Fig. IV is another sectional view which shows the recession of the pilot plunger in the male portion as the pressing operation.

Fig. VA is a perspective view of the locking pin which locks the bolt head when the mould is closed at the end of the pressing operation.

Fig. VB is the perspective view of a cigarette container manufactured according to our invention.

Fig. VI shows in sectional elevation the co-acting mould parts of a device wherein the spring loaded plunger is in the female die. The mould elements are devised for making an ash tray.

Fig. VII is a sectional elevation of the same showing how the spring loaded plunger helps to prevent displacement of the lamination during the pressing operation.

Fig. VIII is a further sectional elevation indicating the drawing in of the lamination into the mould cavity without displacements.

Fig. IX is a similar view showing how the spring loaded plunger has helped in conveying the entire lamination into the mould cavity clear of the confining edge of the male die and in position ready for receiving the moulding pressure.

Fig. X is a sectional elevation showing the final stage in the pressing of an ash tray and indicates the arrangement for locking the plunger at the end of the pressing operation.

Fig. XA is the perspective view of an ash tray manufactured according to our invention.

Impregnated laminations are cut or punched to shape for feeding into a mould. More than one layer of the laminations may be used to impart desired thickness for strength of the finished article. One or more layers of the impregnated laminations (I in Fig. I) are fed into a mould, the periphery 2 of which is of the same shape and size as the lamination. Prior to feeding, the laminations may be sufficiently heated to impart placticity. Figure I represents the stage in which the mould is just beginning to close. 3 represents the male part of the mould, and 4 the female part, each being attached to respective platens of a hydraulic press. The ejector piece is marked 5.

Further object of this invention is to provide a moulding apparatus in which the sheet or lamination is drawn into the mould prior to the application of pressure and crushing of the edges is avoided, and to provide simple means for locking the device which draw the lamination into the mould.

In Figure II, laminations are shown in the initial stage of taking the shape of the mould.

The spring loaded pilot plunger 6 with which the punch is provided, guides the blank down as shown in Figs. II and III before the confining edge 7 comes into contact with the material. At this stage, spring loaded pilot plunger 6 along with the bolt 8 begins to slide upwards with respect to male part of the mould. The spring 9 is thereby compressed, and the head of the bolt 8 operates the tapering face 10 of the locking piece 11, and slides same in horizontal plane to push it out of its way thereby entering hole 13 (Fig. II) and when 6 is completely pressed in position (Fig V) the head of the bolt 8 is locked by the pointed edge 14 sliding under the bolt head by the action of the spring 15 (as shown in Fig. V).

The pilot plunger 6 is unlocked by pressing the locking piece 11 at face 16 when the edge 14 slides away leaving the bolt head free to be pushed down along with plunger 6.

The length of the pilot plunger 6 is adjustable according to the depth of the article to be moulded.

In the process of deep mouldings, unlike shallow ones, there is a considerable gathering of material at the top edge. The thickness of the walls increases progressively from bottom to the top and cannot therefore be uniformly accommodated if the clearance provided between male and female portions of the mould were uniform, as is the case in normal moulding practice. This results in tearing of the material. It has therefore been found necessary to adjust the clearance between the male and the female moulds so as to make due allowance for the greater thickness 17, at the top of the moulded article (as shown in Fig. V). This can be accomplished by providing tapers 18 and 19 (Fig. I) in the press 20 and the die 21 respectively (Fig. I). The tapers may be varied according to the desired wall thickness of the moulded article. In usual moulding practice the two tapers 18 and 19 are of equal magnitude and the purpose for providing them is merely to facilitate the ejection of the moulded article. In our invention taper 18 on the male portion is kept at a minimum so as to facilitate ejection, while taper 19 on the female portion is made suitably larger than 18 with a view to accommodate the gathering of the material referred to above.

Containers, ceiling rose covers or the like articles may be manufactured according to the method described above, which is specially suited for the manufacture of deep mouldings such as cigarette containers, cups or the like.

It is possible to produce on the moulded articles obtained according to our invention raised patterns, ornamental effects, crests, names, trademarks or designs in different colours.

*Example*

Our invention will now be illustrated with reference to the production of a cigarette container and an ash tray (Figs. I–VB and VI–X respectively). The various stages in the conversion of the initial blanks to the final moulded containers can be seen in the accompanying diagrams. An instance of the method followed in actual practice is as follows:

Round pieces of resin impregnated jute are pressed together between two hot plates to render them plastic. In the case of a cigarette container, the pressed piece is put in a wooden or preferably a metallic mould to form a cup shaped blank with evenly divided frills at the top. The "cup" in the case of cigarette container, or the pressed plastic piece in the case of an ash tray is put in hot moulds, and subjected to pressure moulding. The mould is allowed to cool down under pressure before the finished sample is taken out.

It is found that the simple type of ejector is not suitable for working with an ash tray mould, as the blank has a tendency to slip to one side while going down. To avoid this difficulty, a special spring operated pilot plunger which also serves as a protruding ejector (22 in Fig. VI) is constructed as shown in the accompanying diagrams (Figs. VI–X).

When the blank is placed on its seat (see Fig. VI) it is held between the downcoming punch and the ejector 22, which is kept raised by the spring 23. Further pressing guides the blank downwards as in Figs. VII and VIII. After the stage indicated in Fig. VIII, continued pressing brings the ejector down (Fig. IX) till, as shown in Fig. X, the locking piece 24 comes in line with the hole 25 when it is automatically locked by the action of the spring 26.

The ejector is unlocked by pushing the button 27 so that the spindle 28 moves and presses against the locking piece 24 when the spring 23 pushes the released ejector to its initial position as in Fig. VI. The hole 25 and the end of the pin 24 are kept in alignment by providing two slots 29 (Fig. VIII) in the ejector which slide on welded pieces of wire on the corresponding surfaces of the die.

We claim:

1. A device for manufacturing containers from resin impregnated laminations comprising co-acting mould parts, one being a mould of tapering section; the other being a plunger also of tapering section, said plunger having a spring loaded pilot plunger, the pilot plunger having a bolt which travels therewith, a locking piece having an inclined face adapted to slide as the bolt-head strikes against the said face, thereby enabling the bolt head to pass above the locking piece, to lock the bolt head by a pointed edge of the locking piece which slides under the bolt-head by spring action, the pilot plunger being unlocked by pushing the locking piece, whereby the edge which locks up the bolt head slides away, and allows the bolt-head to drop down together with the pilot plunger.

2. A device for manufacturing containers from resin impregnated laminations comprising co-acting mould parts, one being a mould of tapering section, the other being a plunger also of tapering section and having a confining edge in the form of a flange or shoulder, said plunger having a spring loaded pilot plunger, the pilot plunger having a bolt which travels therewith, and which pilot plunger pushes the laminations into the mould cavity prior to the contact of the confining edge of the plunger with the edge of the lamination, so as to prevent crushing of the edges of the laminations by the confining edge during the moulding process, and an arrangement for locking the bolt of the pilot plunger after the mould is closed and for unlocking same when the mould is opened.

3. A device for manufacturing containers from resin impregnated laminations comprising co-acting mould parts, one being a mould of tapering section, the other being a plunger also of tapering section, and having a confining edge, the taper in the former being more than in the latter, said plunger having a spring loaded pilot plunger, the pilot plunger having a bolt which travels therewith, and which pilot plunger pushes the laminations into the mould cavity prior to the contact of the confining edge of the plunger with the edge of the laminations and an arrangement for locking the bolt of the pilot plunger after the mould is closed and for unlocking same when the mould is opened.

BASHESHAR N. SIKKA.
GURBUX SINGH.
LAL C. VERMAN.

REFERENCES CITED

The following references are of record in the file of this patent:

UNITED STATES PATENTS

| Number | Name | Date |
|---|---|---|
| 600,863 | Genese | Mar. 22, 1898 |
| 1,402,286 | DeOlaneta | Jan. 3, 1922 |
| 1,492,510 | DeEscobales | Apr. 29, 1924 |